US010217066B1

(12) United States Patent
Margherio et al.

(10) Patent No.: US 10,217,066 B1
(45) Date of Patent: Feb. 26, 2019

(54) METHODS AND APPARATUS TO MONITOR WORK VEHICLES AND TO GENERATE WORKLISTS TO ORDER THE REPAIR OF SUCH WORK VEHICLES SHOULD A MACHINE FAILURE BE IDENTIFIED

(71) Applicant: Deere & Company, Moline, IL (US)

(72) Inventors: Robert Margherio, University City, MO (US); Brian Orwig, Bettendorf, IA (US); Ann Patting, Andalusia, IL (US); Joey W. Schulz, Independence, IA (US); Vivek K. Sinha, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/688,703

(22) Filed: Aug. 28, 2017

(51) Int. Cl.
*G01M 17/00* (2006.01)
*G06Q 10/06* (2012.01)
*G07C 5/00* (2006.01)
*E02F 9/26* (2006.01)

(52) U.S. Cl.
CPC ............ *G06Q 10/06* (2013.01); *E02F 9/267* (2013.01); *G07C 5/008* (2013.01)

(58) Field of Classification Search
CPC .......... G06Q 10/06; E02F 9/267; G07C 5/008
See application file for complete search history.

(56) References Cited

U.S. PATENT DOCUMENTS

| 9,384,597 | B2 | 7/2016 | Koch et al. |
| 9,563,492 | B2 | 2/2017 | Bell et al. |
| 2003/0120139 | A1* | 6/2003 | Duval ............... A61B 5/18 600/363 |
| 2012/0041635 | A1 | 2/2012 | Johnson et al. |
| 2015/0369236 | A1 | 12/2015 | Campagna et al. |
| 2017/0241414 | A1 | 8/2017 | Billing et al. |
| 2018/0239948 | A1* | 8/2018 | Rutschman .......... G06K 9/0063 |

OTHER PUBLICATIONS

Little, "Failure Modes and Effects Analysis," Tyco Electronics Corp., 22 pages.
ARI, "PartStream" ARI Network Services, retrieved Aug. 28, 2017, from http://arinet.nl/solutions/partstream, 2 pages.

* cited by examiner

*Primary Examiner* — Adam M Alharbi
(74) *Attorney, Agent, or Firm* — Hanley, Flight & Zimmerman, LLC

(57) ABSTRACT

Methods and apparatus to monitor work vehicles and to generate worklists to order the repair of such work vehicles should a machine failure be identified are disclosed. An apparatus includes an interface to access a first and second alerts from first and second work vehicle; an alert scorer to generate first and second scores for the respective first and second alerts; a machine health score determiner to determine first and second machine health score for the respective first and second work vehicles based on the first score and the first weighting factor and the second score and the second weighting factor; and a worklist generator to generate a worklist indicating that the second work vehicle is to be repaired prior to the first work vehicle based on at least one of the first and second machine health scores or an associated first and second classifications.

20 Claims, 11 Drawing Sheets

METHODS AND APPARATUS TO MONITOR WORK VEHICLES AND TO GENERATE WORKLISTS TO ORDER THE REPAIR OF SUCH WORK VEHICLES SHOULD A MACHINE FAILURE BE IDENTIFIED

FIELD OF THE DISCLOSURE

This disclosure relates generally to work vehicles, and, more particularly, to methods and apparatus to monitor work vehicles and to generate worklists to order the repair of such work vehicles should a machine failure be identified.

BACKGROUND

Routine maintenance may be performed on a work vehicle based on a maintenance schedule and/or alerts received. When such maintenance is performed, diagnostic data may be obtained.

SUMMARY

An example apparatus includes an interface to access a first alert from a first work vehicle and a second alert from a second work vehicle; an alert scorer to generate a first score for the first alert and a second score for the second alert, the first and second scores associated with a severity of the respective alerts; a weighting factor applier to associate a first weighting factor with the first alert and to associate a second weighting factor with the second alert; a machine health score determiner to determine a first machine health score for the first work vehicle based on the first score and the first weighting factor and a second machine health score for the second work vehicle based on the second score and the second weighting factor; and a worklist generator to generate a worklist indicating that the second work vehicle is to be repaired prior to the first work vehicle based on at least one of the first machine health score or an associated first classification and at least one of the second machine health score or an associated second classification.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
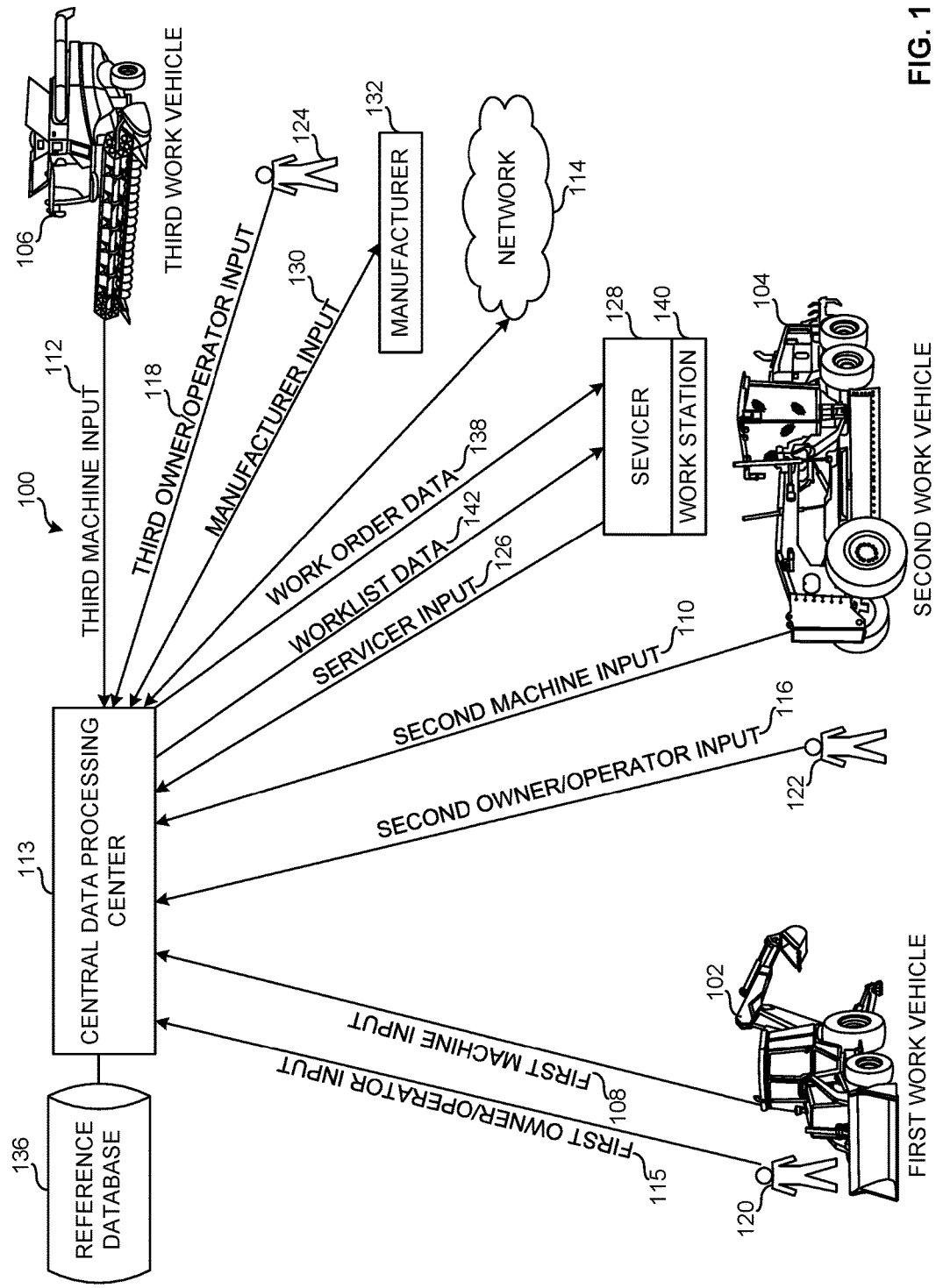
FIG. 1 illustrates an example system for monitoring work vehicles to identify possible machine failures and to generate worklists and work orders to repair such work vehicles should a machine failure be identified.

The examples disclosed herein relate to monitoring work vehicles to identify potential machine failures and/or repairs and to schedule such repairs in an order that satisfies customer expectations. In other words, using the examples disclosed herein, resources for repairing work vehicles may be more efficiently allocated to increase customer satisfaction and/or to enable customers to be proactively supported. By monitoring the work vehicles and generating and comparing machine health scores associated with such monitoring and/or other input in substantially real time, those work vehicles requiring routine maintenance may be identified and those work vehicles requiring more urgent maintenance may be identified. The machine health score may be determined based on machine input, operator input, dealer input, manufacturer input, etc. However, the machine health score may be determined using different types of data and/or different sources of data. In some examples, the machine health score is a dynamic value that is the result of continuous updates when the work vehicle is active and providing diagnostic trouble codes (DTCs) and/or other data. In some examples, machine health scores remain associated with the work vehicle when the machine health score satisfies a threshold and the machine health score and/or an associated alert has not be cleared and/or reviewed by a technician, etc. Additionally or alternatively, the latest machine health score may overwrite and/or otherwise associated with the work vehicle.

The machine input may include alerts, measurement data, faults, calculations made to this data and/or diagnostic trouble codes (DTCs). The dealer input may include a weighting factor (e.g., a dealer importance factor (DIF), a preference). The manufacturer input may include a weighting factor and/or indicators that enable non-relevant alerts to be filtered. Some of the diagnostic trouble codes may be assigned a higher weight and/or urgency than others of the diagnostic trouble codes based on the associated severity. Thus, a first vehicle having a first diagnostic trouble code may be ranked ahead of a second vehicle having a second diagnostic trouble code where the first diagnostic trouble code is assigned a higher weight and/or urgency than the second diagnostic trouble code. Thus, in some example, the machine health score can be determined based on the DTC, a combination of the DTCs, a frequency of occurrence of the respective DTCs and/or a combination of the DTCs and a weighting factor(s) (e.g., a dealer importance factor (DIF)). While the weighting factor(s) may have any value, in some examples, the weighting factor(s) is between zero and one and/or changes seasonally based on the demand of the particular work vehicle and/or work vehicle types. In some examples, the weighting factor and/or the DIF can be a binary (e.g., 0 or 1) multiplier. In some examples, the weighting factor and/or the DIF can have a specific value that is between zero and one, inclusive, or within another selected range.

In some examples, the machine health score enables work vehicles within a fleet or otherwise to be categorized into different groups including a first group of work vehicles, a second group of work vehicles and a third group of work vehicles. In some examples, the first group of work vehicles has a machine health score that satisfies a first threshold indicating that those work vehicles require a first level urgency to service or repair the work vehicles. The first level of urgency may be assigned a first color code (e.g., red). In some examples, the second group of work vehicles has a machine health score that satisfies a second threshold indicating that those work vehicles require a second level urgency to service or repair the work vehicles. The second level of urgency may be assigned a second color code (e.g., yellow). In some examples, the third group of work vehicles has a machine health score that is less than the second threshold indicating that those work vehicles do not require service or repair. The third group of work vehicles may be assigned a third color code (e.g., blue). While the above example mentions organizing the machine health scores and/or the work vehicles themselves into three groups, the machine health scores and/or the work vehicles may be organized in any other suitable way.

While a value of the first threshold may have any correlation to a value of the second threshold, in some examples, the first threshold is two standard deviations from the second threshold. In some examples, the first and second thresholds are determined based on statistical analysis of one or more work vehicles and/or one or more fleets of work vehicles. For example, the thresholds may be determined by dividing the total number of work vehicle event occurrences and/or measured samples into equal groups and/or by mapping the work vehicle event occurrences into a probability density function with or without skewing.

In some examples, the machine health scores (e.g., the machine health diagnostic scores) are used to determine a fleet score where the fleet score is associated with a manufacturer, a model number(s), vehicle type(s), etc. The fleet scores may be organized and/or grouped into quantiles such as, for example, four equal groups (e.g., quartiles), three equal groups, etc. Of course, the fleet scores may be grouped in any desired way including having one or more of the groups having more or less entries than others of the groups. In other words, the number of entries in each group may not be equal.

In examples in which there are three groups, a first one of the groups may be associated with urgent repair, a second one of the groups may be associated with routine maintenance and a third one of the groups may be associated with no action required. In some examples, the fleet scores and/or other associated data may be provided via a communications network as a service (e.g., a subscription service) to the owner of a fleet of work vehicles and/or to a servicer (e.g., a dealer) who may service one or more fleets of vehicles. The fleet's scores and/or other associated data may be provided by the manufacturer and/or by any other party (e.g., a third party bureau and/or service provider).

In some examples, the alerts (DTCs) generated by the work vehicles are associated with an event severity value and/or a dealer importance factor (DIF). The event severity value and/or the dealer importance factor may be changed based on input and/or preferences of the manufacturer, an entity (e.g., a dealer) servicing the work vehicle and/or an owner and/or operator of the work vehicle. In some examples, the dealer importance factor may be used to prioritize the order that work vehicles are serviced to increase customer satisfaction. Additionally or alternatively, in some examples, during a time of year that crops are being harvested (e.g., fall), the dealer importance factor may prioritize servicing harvesters and/or combine equipment and during a time of year that crops are being planted (e.g., spring), the dealer importance factor may prioritize servicing planters and/or tillage equipment. Additionally or alternatively, during a time of year that construction and/or road work is being completed (e.g., summer), the dealer importance factor may prioritize servicing construction equipment and/or road making equipment.

The dealer importance factor may be changed based on user input received and/or may be automatically and/or dynamically updated. In examples in which the dealer importance factor is automatically and/or dynamically updated, the dealer importance factor can be changed based on the time of year, soil moisture conditions, weather conditions and/or a deadline associated with crop insurance. Of course, the dealer importance factor may be changed based on any number of other variables including the location of the work vehicle, the crop(s) being grown, the season, etc.

In some examples, an example display interface is used to display information including a prioritized order to service work vehicles, alerts (e.g., diagnostic trouble codes), diagnoses, predictions and/or analyses for the machine input received. Additionally or alternatively, in some examples, the display interface is used to display information including copies of agreements in place (e.g., dealer service agreements), subscriptions associated with the work vehicles, the number of hours that the work vehicles have been operated, warranty information, machine location, etc. The work vehicles may be displayed in a work que format or a map or machine list format. Regardless of how the worklist is displayed, identifiers (e.g., color coding) that differentiate the prioritizing of the service or repair may be included. Of course, the work vehicles may be listed on the display interface in any other desirable way.

In some examples, based on the diagnoses and/or predictions (e.g., a prediction model), a work order/repair order is automatically generated to service a work vehicle. In other examples, an individual can generate a work order after reviewing the alerts and/or the diagnosis for a particular work vehicle. The diagnoses may include details of how to repair the work vehicle and/or the one or more parts and/or resources to be allocated to repair the work vehicle. In examples in which the diagnoses includes an estimate of the one or more parts used to repair the work vehicle, the examples disclosed herein may search an inventory to determine the presence of the parts in the inventory. In some examples, if a part to be used in a repair is not in inventory and/or is not otherwise available, the examples disclosed herein automatically and/or otherwise generate an order for the part.

To enable the accuracy of the diagnosis and/or predictions to have increased accuracy, in some examples, the model is updateable. For example, the model may be updated based on feedback received on an action taken by a service provider. Some feedback may be related to identifying an alert or a sequence of alerts that are associated with a particular repair and/or identifying an alert as not being relevant.

FIG. 1 is an example system 100 for generating a worklist that prioritizes the repairs of first, second and third work vehicles 102, 104, 106 based on different input received and/or a machine health score determined. In this example, the input includes machine inputs 108, 110, 112 from the work vehicles 102, 104, 106, owner/operator inputs 115, 116, 118 from owner/operators 120, 122, 124 of the work vehicles 102, 104, 106, service input 126 from a servicer (e.g., a dealer) 128 of the work vehicles 102, 104, 106 and manufacturer input 130 from a manufacturer 132 of the work vehicle 102, 104, 106.

In the illustrated example, the first work vehicle 102 is implemented by a backhoe loader, the second work vehicle 104 is implemented by a motor grader and the third work vehicle 106 is implemented by a harvester. However, any of the work vehicles 102, 104, 106 may be implemented by any type of work vehicle. For example, one or more of the work vehicles 102, 104, 106 may be implemented by any type of agricultural equipment, construction equipment, forestry equipment, lawn and/or turf equipment, etc. Further, while the example system 100 includes three work vehicles, in other examples, the system 100 may include any other number of work vehicles (e.g., 100 work vehicles; 1,000 work vehicles; 10,000 work vehicles, etc.) that are similarly and/or differently configured.

The machine input 108, 110, 112 may include alerts, measurement values, faults and/or diagnostic trouble codes (DTCs) that are communicated from the work vehicles 102, 104, 106 to an example central data processing center 113. In the illustrated example, the central data processing center 113 and/or any other components of FIG. 1 or otherwise disclosed herein may be coupled to an example network (e.g., the internet) 114. In some examples, the alerts, measurement values, faults, DTCs are associated with different repairs that have different urgencies, different resource allocations and/or are associated with repairing/replacing different parts.

To determine which of the work vehicles 102, 104, 106 to prioritize repairing, in some examples, the example central data processing center 113 processes the machine inputs 108, 110, 112 by comparing the alerts and/or alert sequences within the machine inputs 108, 110, 112 to reference data and/or an associated model from an example reference database 136. In some examples, the comparison enables alerts and/or alert sequences to be identified having an associated severity level and/or classification, an associated repair/diagnosis predication and/or an associated probable parts prediction used to make such a repair. In some examples, the reference data and/or the associated model includes machine failures, alerts, measurement sequences, alert sequences and/or probable parts used to repair the respective machine failures. In some examples, the data within the model is linked, mapped and/or correlated within the reference data and/or the associated model by the central data processing center 113. In some examples, when linking and/or correlating the data, the central data processing center 113 uses identifiers to substantially ensure the accurate association of the data.

If the central data processing center 113 determines there is a match and/or a substantial match between one of the alerts and/or alert sequences contained within the machine inputs 108, 110, 112 and one of the reference alerts and/or reference alert sequences, in the illustrated example, the central data processing center 113 identifies the associated reference machine failure and generates work order data 138 based on the same. The work order data 138 may include, for example, a work order, a probable list of parts used to repair one or more of the work vehicles 102, 104, 106 and/or directions and/or a manual to repair the one or more work vehicles 102, 104, 106, etc. As used herein, a substantial match between the alert sequence and one of the reference alert sequences means that the alert sequence of the machine input 108, 110, 112 includes at least 90% of the alerts within the reference alert sequence (e.g., nine out of ten alerts of the alert sequence of the machine input 108, 110, 112 matches alerts of one of the reference alert sequences). In this example, the work order data 138 and/or an associated notification can be provided to any individual and/or entity (e.g., business, dealership, fleet manager, etc.) associated with the work vehicles 102, 104, 106 including being provided to a work station 140 at the servicer 128.

While the machine input 108, 110, 112 may be used to generate example worklist data 142 that details the order in which the work vehicles 102, 104, 106 are to be repaired, in some examples, the example central data processing center 113 also uses the owner/operator input 115, 116, 118, the servicer input 126 and/or the manufacture input 130 to generate the worklist 142. The owner/operator input 115, 116, 118, the servicer input 126 and/or the manufacturer input 130 may include a weighting factor(s) and/or information identifying one or more alerts that may be classified as nuisance alerts. The owner/operator input 115, 116, 118, the servicer input 126 and/or the manufacturer input 130 may be automatically and/or dynamically updated based on different factors. The factors may include the time of year, soil conditions, crops being grown, the demand for the work vehicles 102, 104, 106, market fluctuations, pre-paid service plans, warranties, etc. In other words, the input 115, 116, 118, 126, 130 and/or changes thereto enable the order in which jobs are displayed in the worklist data 142 to accurately reflect the current priorities of the owner/operators 120, 122, 124, the servicer 128 and/or the manufacturer 132.

In some such examples, to determine which of the work vehicles 102, 104, 106 to prioritize repairing and, more generally, to generate the worklist 142, the example central data processing center 113 processes the machine inputs 108, 110, 112 in combination with the owner/operator input 115, 116, 118, the servicer input 126 and/or the manufacturer input 130. In some examples, the processing includes increasing the urgency of repairing one or more of the work vehicles 102, 104, 106 and decreasing the urgency of repairing one or more of the work vehicles 102, 104, 106, etc.

For example, the central data processing center 113 may generate a first worklist in which the third work vehicle 106 is repaired first, the second work vehicle 104 is repaired second and the first work vehicle 106 is repaired third and after processing the inputs 115, 116, 118, 126 and/or 130, the central data processing center 113 may generate a second worklist in which the first work vehicle 102 is repaired first, the second work vehicle 104 is repaired second and the third work vehicle 106 is repaired third. In some examples, the reprioritizing of the repair of the first and third work vehicles 102, 106 is based on crops being harvested and/or the owner/operator input 115, 116, 118, the servicer input 126 and/or the manufacturer input 130 assigning a higher priority level to repairing the first work vehicle 102 as compared to the third work vehicle 106 and/or the second work vehicle 104. While the above example mentions updating a first worklist to a second worklist, the examples disclosed herein may continuously update the associated machine health scores and the worklists generated in accordance with the teachings of this disclosure based on the dynamically received data 108, 110, 112, 115, 116, 118, 126, 130 in real-time or otherwise.

To enable the accuracy of the diagnosis and/or predictions to have increased accuracy, in some examples, the reference data and/or the associated model at the reference database 136 is updateable. For example, the reference data and/or the associated model may be updated based on feedback received via one or more of the inputs 108, 110, 112, 115, 116, 118, 126, 130. Thus, the example reference data and/or the associated model may be updated in substantially real time based on data associated with the work vehicles 102, 104, 106 in communication with the system 100. As set forth herein, "substantially real time" accounts for transmission and/or processing delays.

Figure 2:
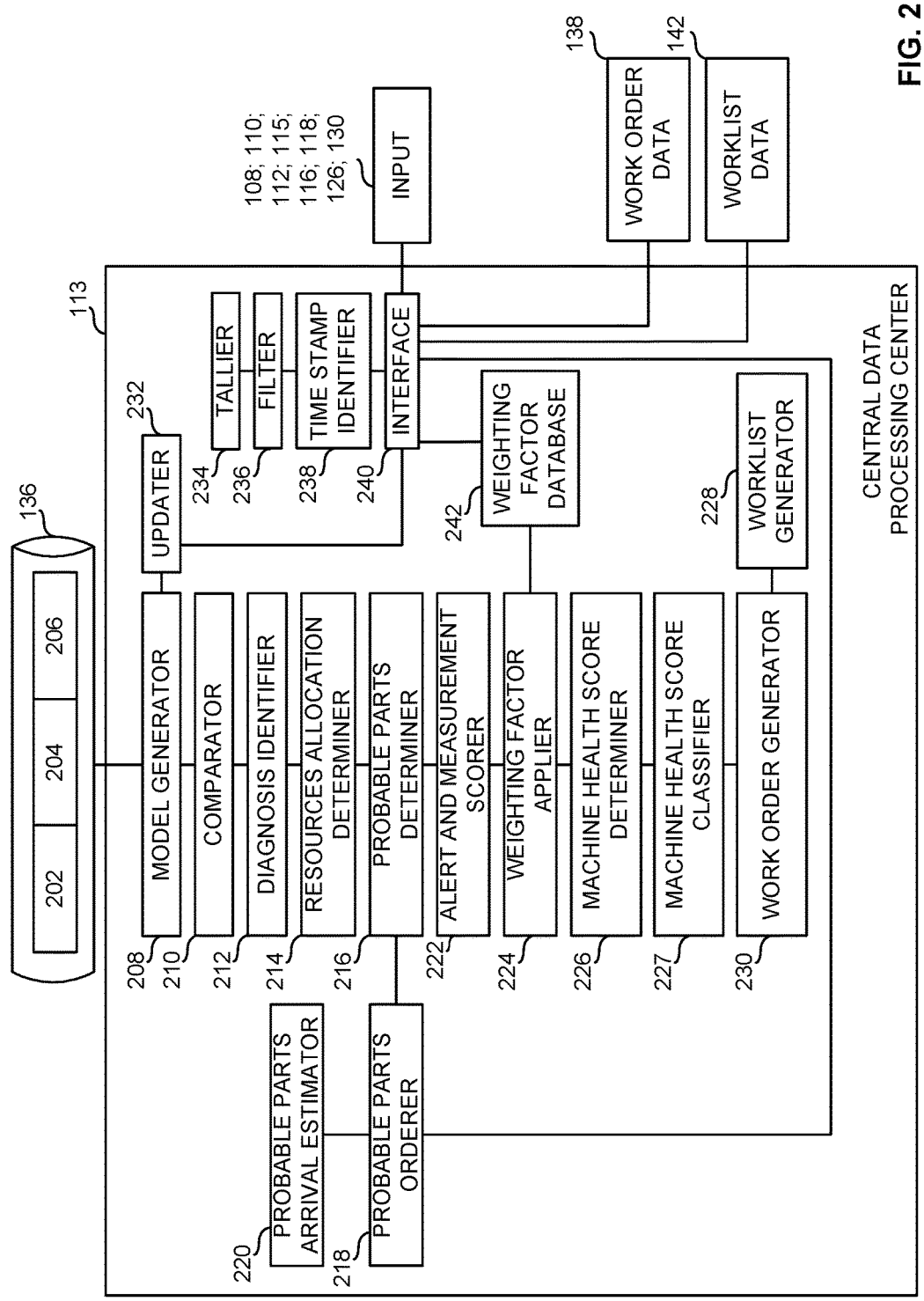
FIG. 2 illustrates an example central data processing center that can be used to implement the system of FIG. 1.

FIG. 2 illustrates an example implementation of the example central data processing center 113 of FIG. 2. In the illustrated example, the central data processing center 113 of FIG. 2 includes an example warranty database 202, an example parts and associated maintenance database 204, an example reference alert and measurement database 206, an example model generator 208, an example comparator 210, an example diagnosis identifier 212, an example resources allocation determiner 214 and an example probable parts determiner 216. In the illustrated example, the central data processing center 113 of FIG. 2 also includes a probable parts orderer 218, an example probable parts arrival estimator 220, an example alert and measurement scorer 222, an example weighting factor applier 224 and an example machine health score determiner 226. In the illustrated example, the example central data processing center 113 of FIG. 2 also includes an example machine health score classifier 227, a worklist generator 228, an example work order generator 230, an example updater 232, an example tallier 234, an example filter 236, an example time stamp identifier 238, an example interface 240 and an example weighting factor database 242. In some examples, the warranty database 202, the parts and associated maintenance database 204, the reference alert and measurement database 206 and the weighting database 242 are implemented at the reference database 136.

To generate a model used to identify potential machine failures, possible parts to repair such machine failures and, more generally, to generate the work order data 138 and/or the worklist data 142, the model generator 208 accesses the warranty data, the parts and associated maintenance data and/or the reference alert data from the respective databases 202, 204, 206 and collates, links and/or otherwise associates the warranty data, the parts and associated maintenance data and/or the reference alert data to enable the data to be in a structured and/or queryable format (e.g., a model, a framework, a structured model, a structured framework, etc.).

In some examples, generating the model includes the model generator 208 classifying the alerts. For example, the alerts may be classified with a first classification, a second classification and/or a third classification. The first classification may be associated with parameters of the work vehicle 102, 104, 106 being in a normal operating range and/or within a threshold of the normal operating range (e.g., a normal range, a compliant range). The second classification may be associated with the parameters of the work vehicle 102, 104, 106 being outside of the normal operating range and/or outside the threshold of the normal operating range (e.g., a transition range, a grey operating range). The third classification may be associated with the parameters of the work vehicle 102, 104, 106 being highly and/or significantly outside of the normal operating range and/or significantly outside the threshold of the normal operating range (e.g., an abnormal range, a non-compliant range). In some examples, the first classification is associated with a first color, the second classification is associated with a second color and the third classification is associated with a third color. Of course, any indicator may be used to differentiate the classifications and the model generator 208 may use any number of classifications (e.g., 10 classifications, 100 classifications, 1000 classifications).

The warranty data from the warranty database 202 may include maintenance logs and/or failure information associated with work vehicles such as, for example, the first work vehicle 102, the second work vehicle 104 and/or the third work vehicle 106. The parts and associated maintenance data from the parts and associated maintenance database 204 may include software information and/or part lists and/or technical documentation used when performing maintenance and/or repairs on work vehicles such as, for example, the first work vehicle 102, the second work vehicle 104 and/or the third work vehicle 106. In some examples, the software information includes updates and/or changes to software and/or processes on a work machine. The reference alert data from the reference alert and measurement database 206 may include machine alert and/or telematics data. Any one of the warranty database 202, the parts and associated maintenance database 204 and/or the reference alert and measurement database 206 may be updatable based on the machine input 108, 110 and/or 112, the owner/operator input 115, 116 and/or 118 and/or the manufacturer input 130.

To enable the classifications of the alerts to represent the prioritizations of the owner/operator 120, 122, 124, the servicer 128 and/or the manufacturer 132, in the illustrated, the model generator 208 accesses the weighting factor database 242 and/or one or more of the inputs 108, 110, 112, 115, 116, 118, 126, 130 to determine if any of the alerts within the model have an associated weighting factor. In examples in which weighting factors are present for one or more of the alerts, the model generator 208 updates the model based on the weighting factors, associates the alerts with the corresponding weighting factor and/or reclassifies the alert based on the weighting factor. While this example mentions updating the model and/or reclassifying alerts based on an associated weighting factor, these updates and/or reclassifications may be dealer specific, manufacturer specific, region specific, customer specific and/or applicable to a work vehicle type and/or a particular model number.

In some examples, by associating a weighting factor with one or more of the alerts, the model generator 208 reclassifies the alert from a first classification to a second classification. Additionally or alternatively, in some examples, by associating a weighting factor with one or more of the alerts, the model generator 208 conditionally classifies a first alert as a fourth classification when the work vehicle 102, 104, 106 is a planter and conditionally classifies the first alert as a first classification when the work vehicle 102, 104, 106 is a harvester. The weighting factors may be dynamically updated by the owner/operator 120, 122, 124, the servicer 128 and/or the manufacturer 132. Thus, the classification of a particular alert for a type of work vehicle (e.g., a combine) and/or a group of work vehicles may be changed from one day to the next or from one season to the next. Furthermore, the classification of a particular alert for a type of work vehicle (e.g., a combine) and/or a group of work vehicles may be changed from one region and/or area to the next.

To enable the reference data and/or the model to incorporate feedback from the owner/operator 120, 122, 124, the servicer 128 and/or the manufacturer 132, in the illustrated, the model generator 208 and/or the updater 232 accesses one or more of the inputs 108, 110, 112, 115, 116, 118, 126, 130 to determine if there is any feedback present for one or more of the alerts within the model. In some examples, the feedback includes an indication that an alert and/or a sequence of alerts is a nuisance alert and, thus, should be ignored and/or otherwise not addressed. In some examples, the feedback includes an indication that an alert and/or sequence of alerts is associated with a probable parts list, directions to repair the one or more work vehicles 102, 104, 106 based on the alert, etc.

In the illustrated example, to identify machine failures within the alert data, the central data processing center 113 accesses the machine input 108, 110, 112 at the interface 240 and the time stamp identifier 238 identifies the time stamp associated with the respective alerts and/or identifies when the respective alerts were generated. In some examples, the filter 236 filters alerts and/or alert sequences from the machine input 108, 110, 112 that were not generated within a threshold amount of time. While any threshold of time may be selected, in some examples, the filter 236 may filter alerts that were not generated within 48-hours, 7-days, 14-days, 30-days, etc. In this example, as the machine input 108, 110, 112 is being accessed by the central data processing center 113, the tallier 234 tallies the number of occurrences of each alert from the different work machines 102, 104, 106.

To identify alerts within the machine input 108, 110, 112, the comparator 210 compares the alerts accessed from the work vehicles 102, 104, 106 to the model generated by the model generator 208 to determine if there is a substantial match between one or more of the alerts and the reference alert data in the model. If there is a substantial match between the alert from the work vehicles 102, 104, 106 and the reference data, the diagnosis identifier 212 generates a diagnosis prediction to repair the work vehicle 102, 104, 106, the resources allocation determiner 214 determines the resources to be allocated to repair the work vehicle 102, 104, 106 and/or the probable parts determiner 216 determines the probable parts used to repair the work vehicle 102, 104, 106.

In examples in which the probable parts determiner 216 determines that parts are to be used to repair of the work vehicle 102, 104, 106, the probable parts orderer 218 determines whether the part is in stock and/or is otherwise available. In examples in which the probable parts orderer 218 determines that the part and/or parts is not in stock, the probable parts orderer 218 places an order for the part and the probable parts arrival estimator 220 estimates when the part will arrive. In some examples, the determinations made by one or more of the diagnosis identifier 212, the resources allocation determiner 214, the probable parts determiner 216, the probable parts orderer 218 and/or the probable parts arrival estimator 220 may be used to determine if and/or when a repair(s) is to be performed on the work vehicle 102, 104, 106.

To determine the severity of the alert, in the illustrated example, the alert and measurement scorer 222 references the reference data and/or the model to determine if there is a classification within the model for the alerts within the machine inputs 108, 110, 112. In some examples, the alert and measurement scorer 222 determines if there is a substantial match between the machine input 108, 110, 112 and the reference alert having a corresponding classification based on a comparison. In examples in which there is a substantial match between the machine input 108, 110, 112 and the reference alert having a corresponding classification, the alert and measurement scorer 222 associates the classification with the respective alerts.

To prioritize the repair of the work vehicles 102, 104, 106 based on the input 108, 110, 112, 115, 116, 118, 126 and/or 130 and/or the weighting factor database 242, in the illustrated example, the weighting factor applier 224 determines if there is a weighting factor for one or more of the alerts within the reference data. In examples in which there is a weighting factor associated with the alert, the weighting factor applier 224 applies the weighting factor to the associated alert, reclassifies the alert based on the weighting factor and/or otherwise associates the alert with the corresponding weighting factor.

To generate a machine health score for the different work vehicles 102, 104, 106, in the illustrated example, the machine health score determiner 226 accesses the data from one or more of the tallier 234, the diagnosis identifier 212, the resources allocation determiner 214, the probable parts determiner 216, the probable parts orderer 218, the probable parts arrival estimator 220, the alert and measurement scorer 222, the weighting factor applier 224 and, more generally, the inputs 108, 110, 112, 115, 116, 118, 126, 130 from the different sources 102, 104, 106, 120, 122, 124, 128, 132. In some examples, the determined machine health scores are classified by the machine health score classifier 227. For example, some of the machine health scores may be classified in a manner that indicates that the work machine 102, 104, 106 needs attention, the work machine 102, 104, 106 is to be watched and/or monitored and/or the work machine 102, 104, 106 is operating normally. In some examples, the machine health scores are grouped by identifying a first threshold above an average machine health score and a second threshold below the average machine health score.

Equation 1 below provides an example of how the machine health scores may be determined. Referring to Equation 1, DateTimeRatio represents the time period that is being examined, $\Sigma MHMValue_{DTC}$ represents the summation of machine health scores for each DTC, $\Sigma MHMValue_{PartAlertValue}$ represents the summation of the machine health scores for each alert value, $\Sigma MHMValue_{MaintenanceAlert}$ represents the summation of the machine health scores for each maintenance alert value and $\Sigma MHM_{Total}$ represents the summation of the machine health scores including the machine health scores for each DTC, the machine health scores for each alert value and the machine health score for each maintenance value.

$$\text{MHM Value}_{Total} = [\text{DateTimeRatio}*(\Sigma \text{MHM Value}_{DTC})] + [\Sigma \text{MHM Value}_{Part\ Alert\ Value}] + [\Sigma \text{MHM Value}_{Maintenance\ Alert}] \quad \text{Equation 1:}$$

In some examples, the value of DateTimeRatio is larger when the time period is smaller (e.g., $$\left(\text{e.g., } \frac{24 \text{ hours}}{12 \text{ hours}} = 2\right)$$

and the value of the DateTimeRatio is smaller when the time period is larger (e.g., $$\left(\text{e.g., } \frac{24 \text{ hours}}{168 \text{ hours}} = 0.143\right).$$

In some examples, Equation 2 is used to determine the $\text{MHMValue}_{DTC}$.

$$\text{MHM Value}_{Dtc} = \text{Severity score}*\text{Occurance count score}*\text{Visibility score}*\text{Dealer importance factor} \quad \text{Equation 2:}$$

Referring to Equation 2, the severity score may be associated with a first symbol (e.g., a stop symbol) indicating that the work vehicle has stopped working, a second symbol (e.g., a warning symbol) indicating a service alert, a third symbol (e.g., an information symbol) indicating an information alert or a grey alert indicating that data is missing. In some examples, when a count score of a particular alert occurring is greater than a first value, the occurrence count score is a first occurrence count score, when the count score is less than the first value and greater than a second value, the occurrence count score is a second occurrence count score and when the count score is less than the second value, the occurrence count score is a third occurrence count score. In some examples, the visibility score is associated with a first value when the alert and/or issue is visible and/or noticeable to the operator of the work vehicle and the visibility score is associated with a second value when the alert and/or issue is not visible and/or not noticeable to the operator of the work vehicle. In some examples, the dealer importance factor is associated with a platform and enables a diagnostic trouble code (DTC) to change based on insights on the DTC, a time of year, etc. In other words, the dealer importance factor enables the DTC to be weighted based on one or more preferences. Because examples disclosed herein may receive numerous MHM Value$_{Dtcs}$, the MHM Value$_{Dtcs}$ may be summed as shown in Equation 1.

In some examples, the MHM Value$_{Part\ Alert\ Value}$ is associated with a first value and/or a first color (e.g., red) when the alert is critical (e.g., the machine failure is imminent). In some examples, the MHM Value$_{Part\ Alert\ Value}$ is associated with a second value and/or a second color (e.g., yellow) when the alert is major and/or when the machine failure will likely occur but it not imminent. In some examples, the MHM Value$_{Part\ Alert\ Value}$ is associated with a third value and/or a third color (e.g., blue) when the alert is normal and/or when the machine is operating normally. Because the examples disclosed herein may receive numerous MHM Value$_{Part\ Alert\ Values}$, the MHM Value$_{Part\ Alert\ Values}$ may be summed as shown in Equation 1.

In some examples, the MHM Value$_{Maintenance\ Alert}$ changes from a low value and/or a first color (e.g., blue) to a higher value and/or a second color (e.g., yellow) as the work machine gets closer to a time for service. Because the examples disclosed herein may receive numerous MHM Value$_{Maintenance\ Alerts}$, the MHM Value$_{Maintenance\ Alerts}$ may be summed as shown in Equation 1.

In some examples, the determined machine health scores and/or the associated classifications are compared by the comparator 210 to reference data and/or otherwise to determine which of the work vehicles 102, 104, 106 are to be repaired and/or the order in which one or more of the work vehicles 102, 104, 106 are to be repaired. One of the work vehicles 102, 104, 106 having a higher machine health score and/or associated classification may cause that work vehicle 102, 104, 106 to be scheduled ahead of the other work vehicles 102, 104, 106 having a lower machine health score and/or associated classification.

Figure 3:
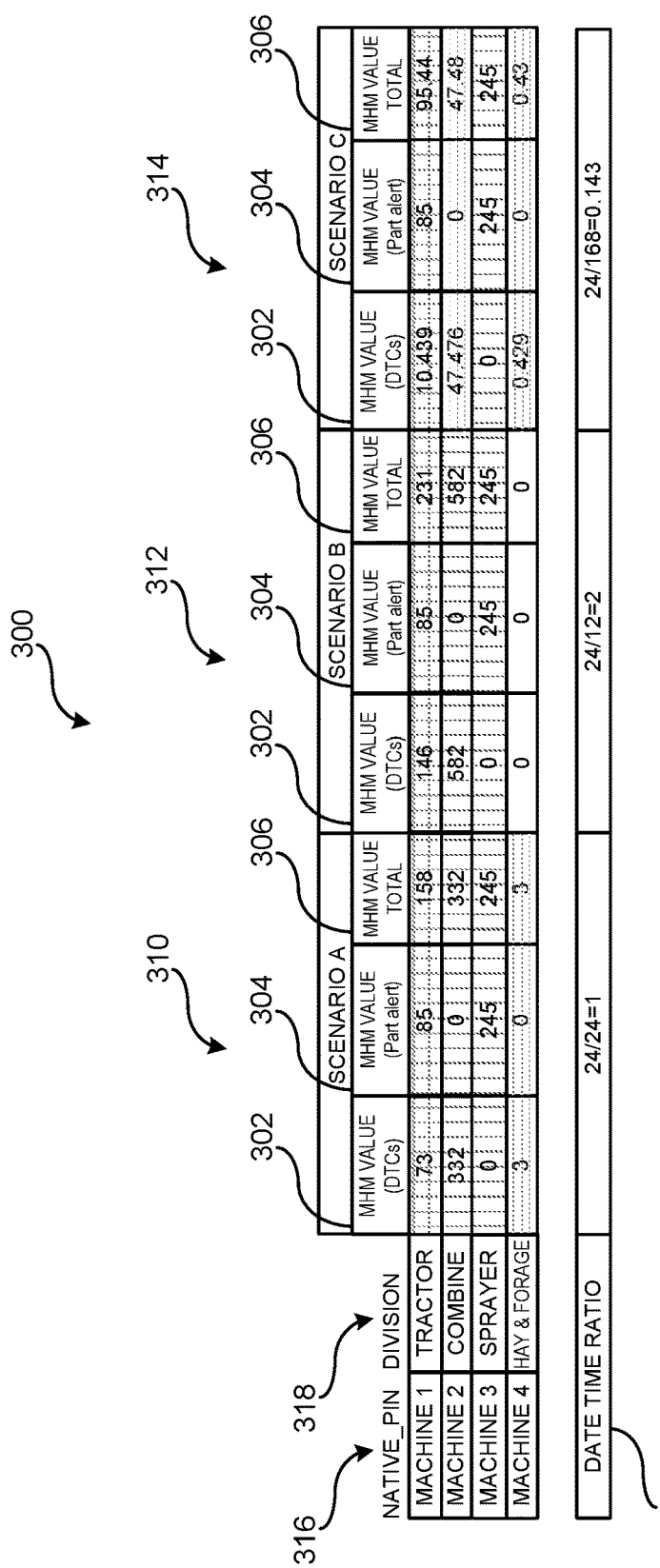
FIG. 3 illustrates an example table including data generated and/or used when implementing the examples disclosed herein.

Referring to FIG. 3, an example chart 300 is included of example MHM Value$_{DTCs}$ 302, example MHM Value$_{Part\ Alert\ Values}$ 304, example MHM Value$_{Totals}$ 306 and example DateTimeRatios 308 for an example first scenario 310, an example second scenario 312 and an example third scenario 314. In the example chart 300, the values 302, 304, 306 are provided for different divisions 316 of work machines 318.

Figure 4:
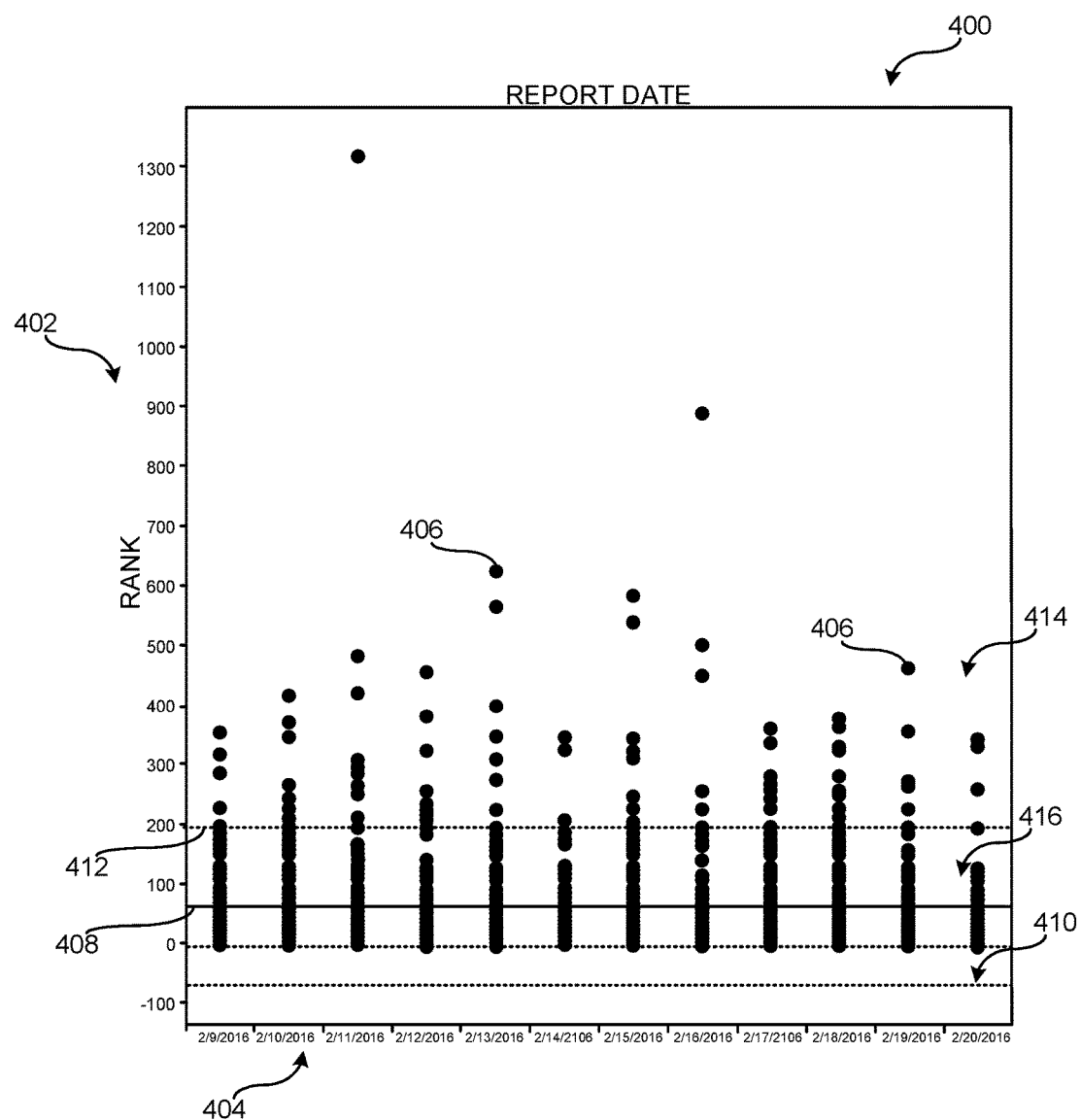
FIG. 4 is an example graph generated using the examples disclosed herein.

FIG. 4 illustrates an example graph 400 including a y-axis 402 representing ranks and/or machine health scores for a time period (e.g., one day) and an x-axis 404 representing the date and/or the time period. In the illustrated example, each of data entries 406 represent a machine health score for a single day for different ones of the work vehicles. Based on processing the data entries 406, a first threshold and/or breakpoint 408 is determined based on identifying a first group 410 of the data entries 406 below an average of the machine health scores of the data entries 406. Additionally, based on processing the data entries 406, a second threshold and/or breakpoint 412 is determined based on identifying a second group 414 of the data entries 406 above the average of the machine health scores represented by the data entries 406. Additionally, based on processing the data entries 406, a third group 416 of the data entries 406 is determined between the first and second thresholds 408, 412 associated with the average. In some examples, the first group 410 is associated with a first and/or blue rank indicating that the work machine is operating normally. In some examples, the second group 414 is associated with a third and/or red rank indicating that the work machine is to be serviced and/or needs attention. In some examples, the third group 416 is associated with a second and/or yellow rank indicating that the work machine is to be watched. In some examples, the breakpoints 408, 412 can be determined using historic DTC data and/or measurement data to determine what rank (e.g., a first rank, a second rank, etc.) and/or what color code (e.g., a first color code, a second color code, etc.) a newly received DTC is associated with.

Referring back to FIG. 2, in examples in which the machine health score determiner 226, the machine health score classifier 227 and/or the comparator 210 determines that one or more repairs are to be performed on the first work vehicle 102, the work order generator 230 generates the work order data 138 associated with performing a repair on the first work vehicle 102. In examples in which the machine health score determiner 226, the machine health score classifier 227 and/or the comparator 210 determines that one or more repairs are to be performed on the first work vehicle 102 and the second work vehicle 102 and no repairs are to be performed on the third work vehicle 106, the worklist generator 228 may generate the worklist data 142 that prioritizes the repair of one of the work vehicles 102, 104 over the other of the work vehicles 102, 104. In some examples, the repair of one of the work vehicles 102, 104, 106 over others of the work vehicles 102, 104, 106 may be based on the time of year, an agreement in place between the second owner/operator 122 and the servicer 128 and/or any other reason.

While an example manner of implementing the central data processing center 113 of FIG. 1 is illustrated in FIG. 2, one or more of the elements, processes and/or devices illustrated in FIG. 2 may be combined, divided, re-arranged, omitted, eliminated and/or implemented in any other way. Further, the example warranty database 202, the example parts and associated maintenance database 204, the example reference alert and measurement database 206, the example model generator 208, the example comparator 210, the example diagnosis identifier 212, the example resources allocation determiner 214, the example probable parts determiner 216, the probable parts orderer 218, the example probable parts arrival estimator 220, the example alert and measurement scorer 222, the example weighting factor applier 224, the example machine health score determiner 226, the example machine health score classifier 227, the example worklist generator 228, the example work order generator 230, the example updater 232, the example tallier 234, the example filter 236, the example time stamp identifier 238, the example interface 240, the example weighting factor database 242 and/or, more generally, the example central data processing center 113 of FIG. 1 may be implemented by hardware, software, firmware and/or any combination of hardware, software and/or firmware. Thus, for example, any of the example warranty database 202, the example parts and associated maintenance database 204, the example reference alert and measurement database 206, the example model generator 208, the example comparator 210, the example diagnosis identifier 212, the example resources allocation determiner 214, the example probable parts determiner 216, the probable parts orderer 218, the example probable parts arrival estimator 220, the example alert and measurement scorer 222, the example weighting factor applier 224, the example machine health score determiner 226, the example machine health score classifier 227, the example worklist generator 228, the example work order generator 230, the example updater 232, the example tallier 234, the example filter 236, the example time stamp identifier 238, the example interface 240, the example weighting factor database 242 and/or, more generally, the example central data processing center 113 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example warranty database 202, the example parts and associated maintenance database 204, the example reference alert and measurement database 206, the example model generator 208, the example comparator 210, the example diagnosis identifier 212, the example resources allocation determiner 214, the example probable parts determiner 216, the probable parts orderer 218, the example probable parts arrival estimator 220, the example alert and measurement scorer 222, the example weighting factor applier 224, the example machine health score determiner 226, the example machine health score classifier 227, the example worklist generator 228, the example work order generator 230, the example updater 232, the example tallier 234, the example filter 236, the example time stamp identifier 238, the example interface 240, the example weighting factor database 242 and/or, more generally, the example central data processing center 113 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central data processing center 113 of FIG. 1 may include one or more elements, processes and/or devices in addition to, or instead of, those illustrated in FIG. 2, and/or may include more than one of any or all of the illustrated elements, processes and devices.

Figure 5:
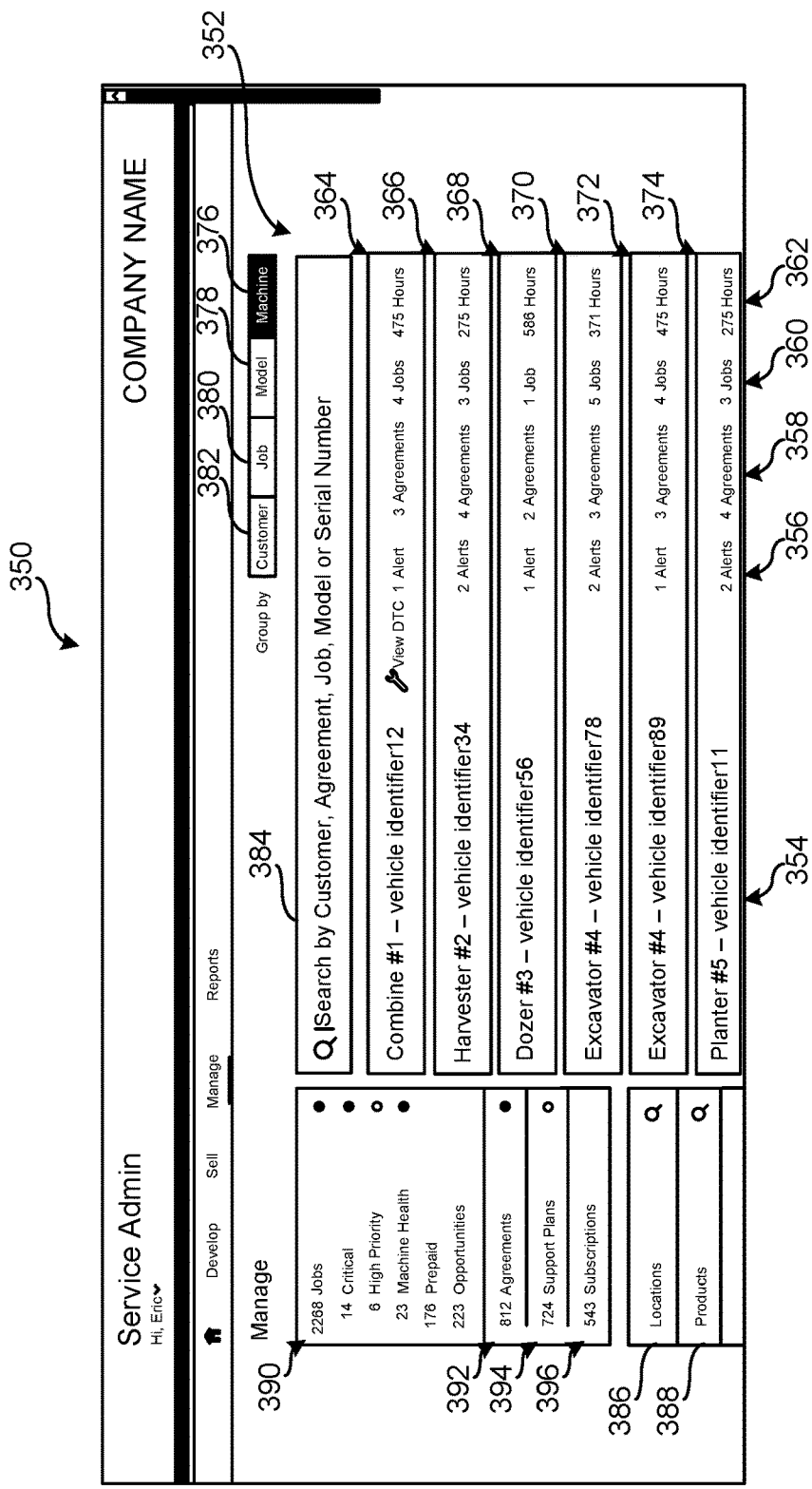
FIG. 5 illustrates an example display including an example worklist to repair work vehicles generated in accordance with the teachings of this disclosure.

FIG. 5 illustrates an example display 350 generated in accordance with the teachings of this disclosure that may be displayable at the work station 140 and/or at any other location. In the illustrated example, the display 350 includes a worklist 352 including entries displayed in columns 354, 356, 358, 360, 362 and corresponding rows 364, 366, 368, 370, 372, 374.

In this example, the first column 354 describes different work vehicles in queue to be repaired, the second column 356 displays a tally of the alerts generated by the different work vehicles and the third column 358 displays a tally of the agreements associated with the different work vehicles. Additionally, in this example, the fourth column 360 displays a tally of the jobs associated with the different work vehicles and the fifth column 362 displays the number of hours that the different work vehicles have been used.

In some examples, the agreements are service agreements between the owner/operator of the work vehicles and the servicer that services the work vehicles (e.g., the dealer). In some examples, the agreements are accessible and/or viewable by selecting and/or otherwise hovering over an agreement icon in one or more of the rows 364, 366, 368, 370, 372, 374. In some examples, the jobs are associated with work orders that describe services to be performed on the work vehicles that are listed in the different rows 364, 366, 368, 370, 372, 374. In some examples, the jobs and/or the work orders are accessible and/or viewable by selecting and/or otherwise hovering over a job icon in one or more of the rows 364, 366, 368, 370, 372, 374.

In the illustrated example, the display 350 also includes a machine tab 376, a model tab 378, a job tab 380 and a customer tab 382. In some examples, the tabs 376, 378, 380, 382 are selectable to, for example, group the entries from the different rows 364, 366, 368, 370, 372, 374 in different ways. For example, if the customer tab 382 is selected, worklist entries for the same customer may be grouped together. If the model tab 378 is selected, worklist entries for the same model may be grouped. Further, the example display 350 includes search bars 384, 386, 388 to enable a user to enter criteria to search the worklist 352 based on, for example, a customer, an agreement, a job, a model, a serial number, a location, a product, etc.

In this example, the display 350 includes a first expandable entry 390 relating to jobs, a second expandable entry 392 relating to agreements, a third expandable entry 394 relating to support plans and a fourth expandable entry 396 relating to subscriptions. As shown in the example of FIG. 3, the first expandable entry 390 is expanded to display both high-level details relating to jobs (e.g., 2268 active jobs) and more-focused details on at least some of those jobs (e.g., 6 high-priority jobs).

Figure 6:
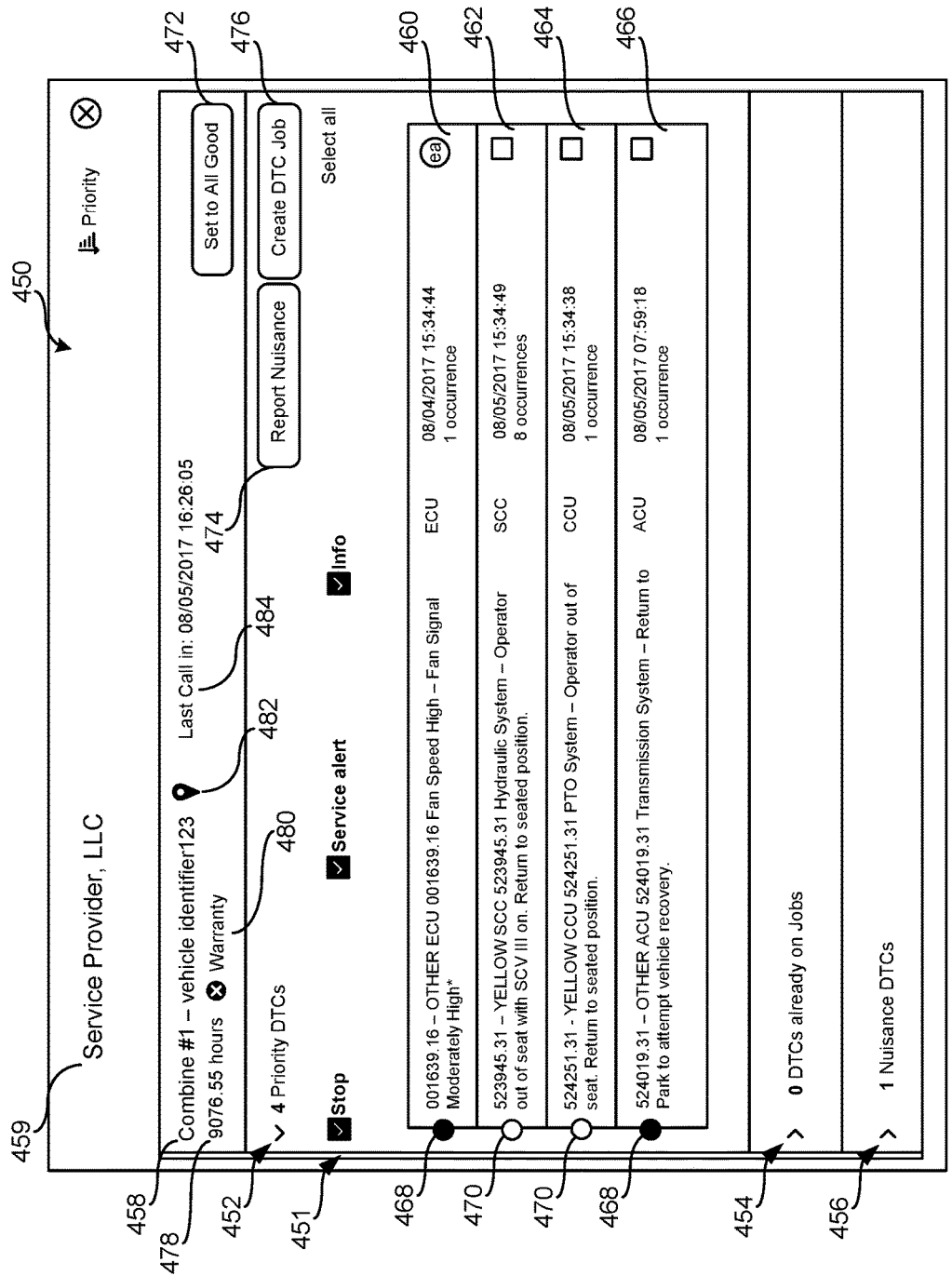
FIG. 6 illustrates an example display including example alerts and example details of those alerts generated in accordance with the teachings of this disclosure.

FIG. 6 illustrates an example display 450 that can be generated in response to one of the alert tallies in the second column 356 of FIG. 5 being selected. In some examples, the display 450 is displayable at the work station 140 of FIG. 1 and/or at any other location. In the illustrated example, the display 450 includes a color-coded prioritization indicator 451, a first expandable entry 452 relating to priority diagnostic trouble codes (DTCs), a second expandable entry 454 relating to DTCs that are already on jobs and/or being addressed and a third expandable entry 456 relating to nuisance and/or DTCs that can be ignored. As shown in the example of FIG. 6, the color-coded prioritization indicator 451 is a vertical bar along a side of the display 450 having a color (e.g., yellow). In some examples, the color-coded prioritization indicator 451 indicates that a work vehicle 458 being serviced by a service provider 459 is outside of the normal operating range. Of course, the color-coded prioritization indicator 451 can be any color to provide an indication of the priority of the alert, the repair of the work vehicle 458, etc.

In this example, the first expandable entry 452 is shown expanded to display both high-level details relating to the priority DTCs (e.g., 2 priority DTCs) and more-focused details relating to the alerts in rows 460, 462, 464, 466. For example, the rows 460, 462, 464, 466 include details on the number of times a particular alert has been generated and color-coded indicators including a first color code 468 and a second color code 470. Additionally, in this example, the rows 460, 462, 464, 466 include a description of the alert and notes and/or suggestions on addressing the alert and/or repairing the work vehicle 458. In some examples, the first color code 468 is indicative of the alert having a second level of urgency and the second color code 470 is indicative of the alert having a third level of urgency. Of course, the color codes 468, 470 can have any other type of meaning.

Further, the example display 450 includes a first icon 472, a second icon 474, a third icon 476, an operating hours indication 478, a warranty presence indication 480, a machine location indicator 482 and a last call-in description 484. In some examples, selecting the first icon 472 enables one or more of the alerts to be identified as resolved and/or "all good" and such feedback may be incorporated into one or more of the inputs 108, 110, 112, 115, 116, 118, 126, 130. In some examples, selecting the second icon 474 reports a nuisance alert and/or an alert that can be ignored and such feedback may be incorporated into one or more of the inputs 108, 110, 112, 115, 116, 118, 126, 130. In some examples, selecting the third icon 476 enables a new work order and/or job to be created. In some examples, reporting the nuisance alert is included in the servicer input 126 and the new work order is included in the work order data 138 and/or the worklist data 142.

Figure 7:
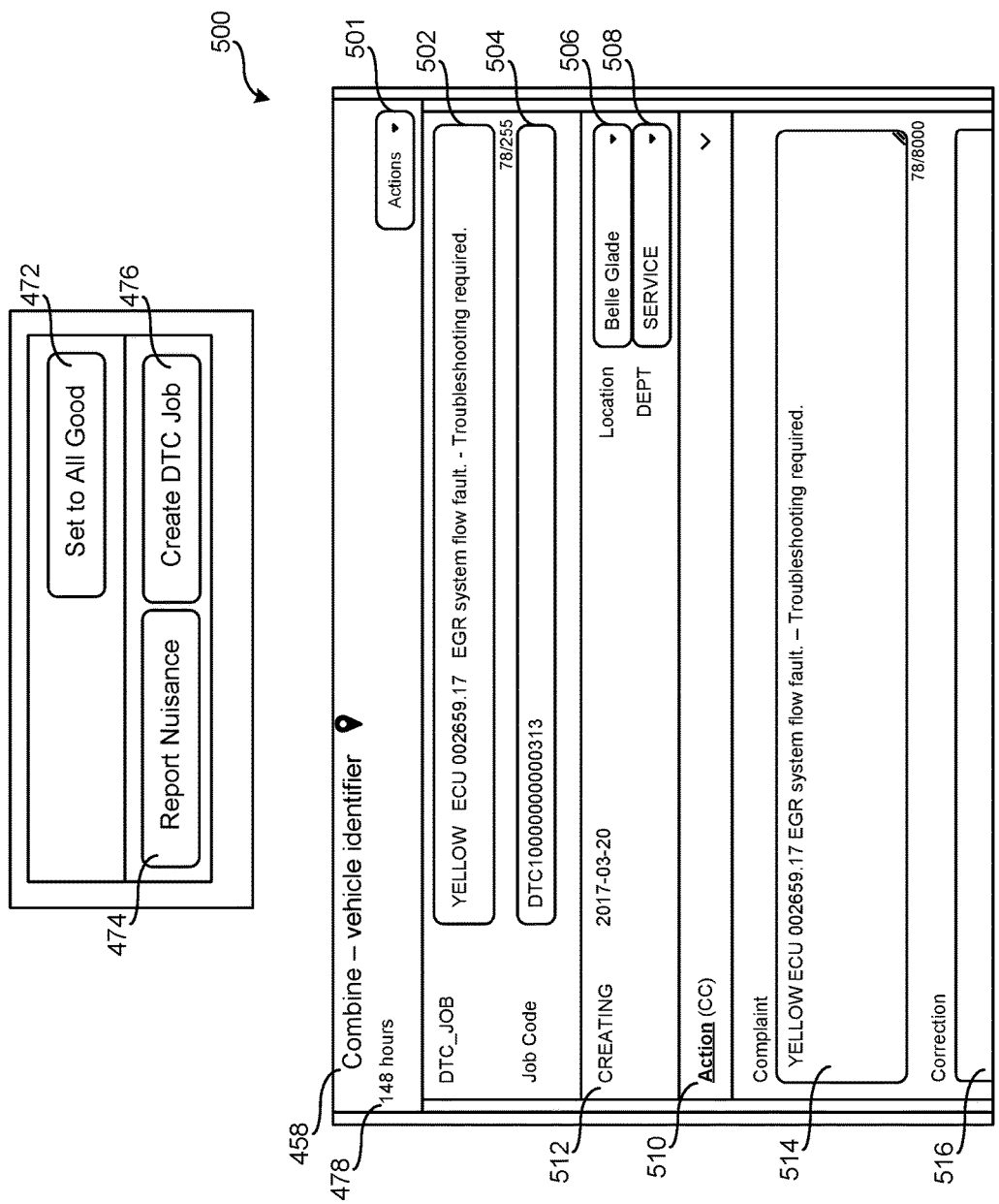
FIG. 7 illustrates an example work order generated in accordance with the teachings of this disclosure.

FIG. 7 illustrates an example display 500 generated in response to the second icon 474 being selected that may be displayable at the work station 140 of FIG. 1 and/or at any other location. In some examples, the work orders are automatically generated. In some examples, the work orders are generated based on input received from a technician, an operator and/or another individual associated with the work vehicle.

In the illustrated example, the display 500 includes a dropdown menu 501, a first field 502 including details on the job, a second field 504 including details on a job code, a third field 506 including details on the location of the work vehicle 458 and/or a location of the service provider and a fourth field 508 including details on the department to perform the diagnosis and/or the repair of the work vehicle 458. In this example, the dropdown menu 501 is showing that "actions" have been selected enabling an action section 510 to be displayed. Additionally, in the illustrated example, the display 500 includes a fifth field 512 including details on when the work order was created, a sixth field 514 including details of the complaint, alert and/or problem being faced by the work vehicle 458 and a seventh field 516 including a description on how to address the complaint, alert and/or problem including, for example, reference materials.

Figure 8:
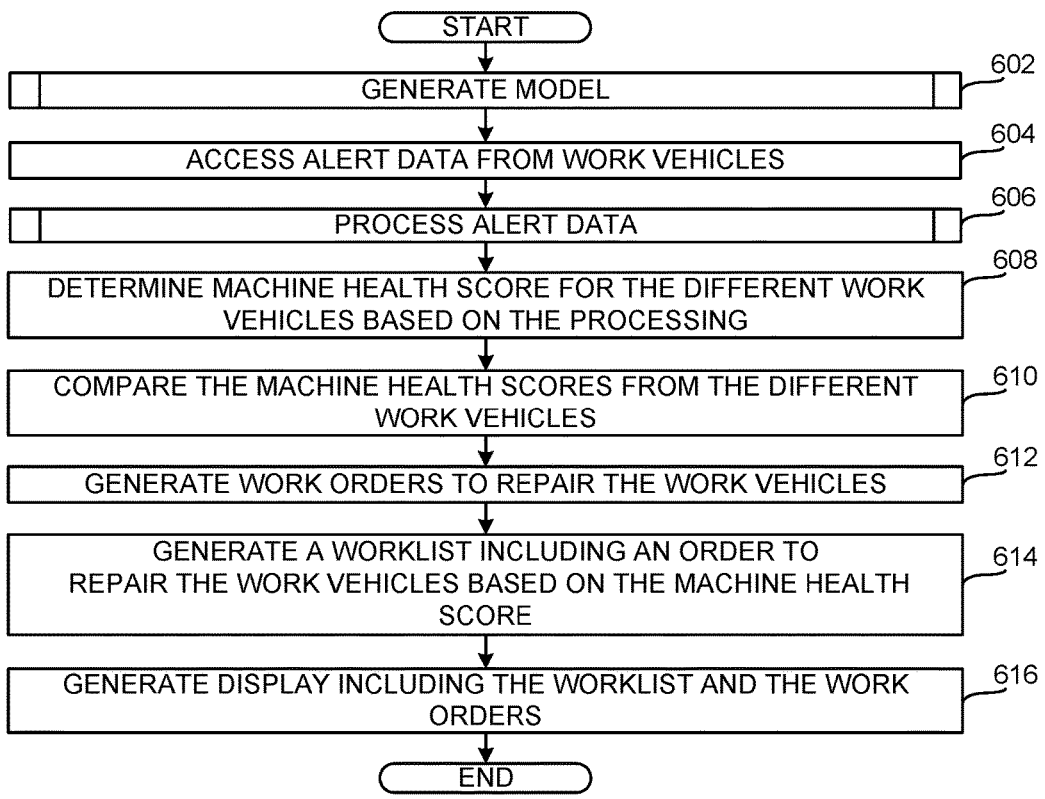
FIGS. 8, 9 and 10 are representative of machine readable instructions that may be executed to implement the example central data processing center of FIGS. 1 and/or 2.
Figure 9:
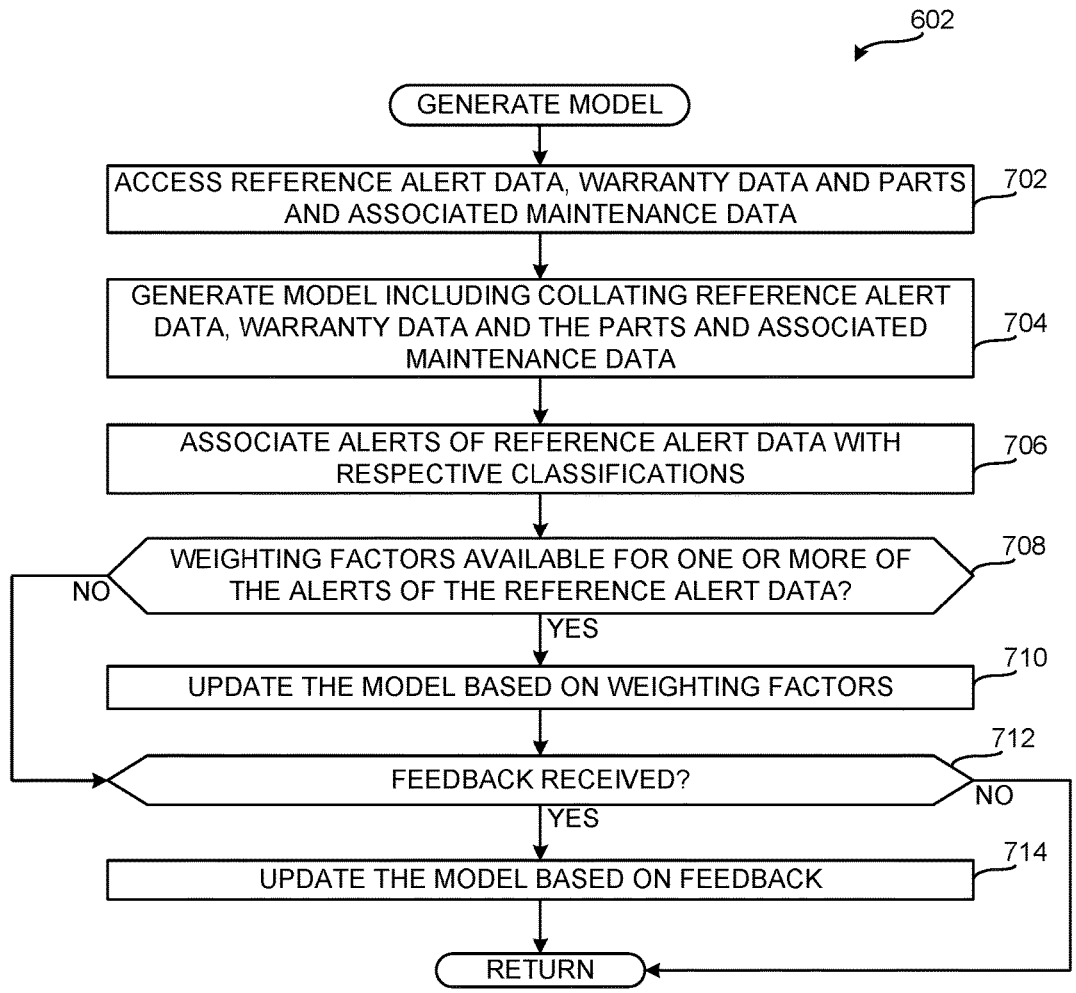
Figure 10:
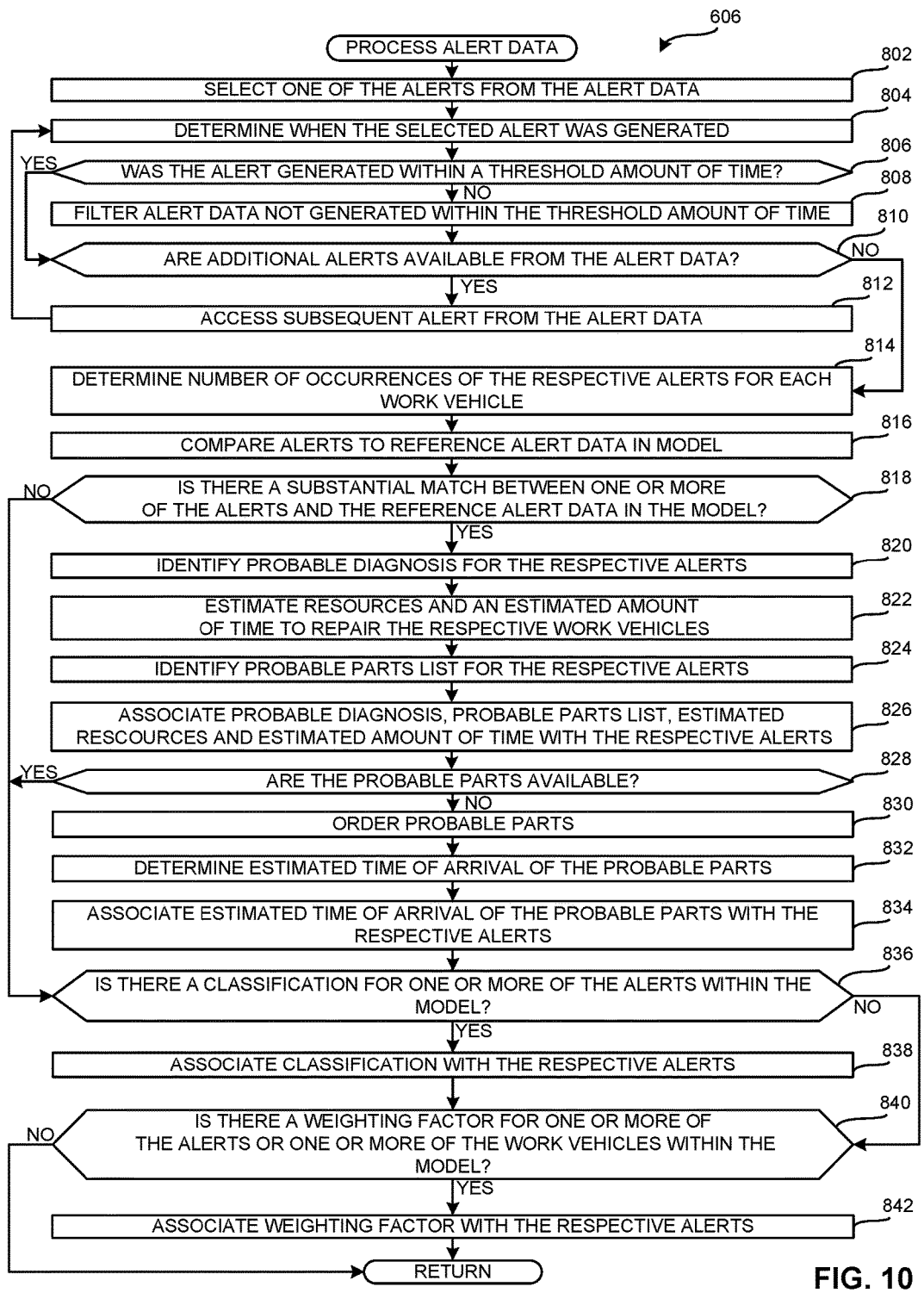

A flowchart representative of example machine readable instructions for implementing the central data processing center 113 of FIG. 2 is shown in FIGS. 8, 9 and 10. In this example, the machine readable instructions comprise a program for execution by a processor such as the processor 912 shown in the example processor platform 900 discussed below in connection with FIG. 11. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 8, 9 and 10, many other methods of implementing the example central data processing center 113 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 8, 9 and 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program of FIG. 8 begins at block 602 with the model generator 208 generating a model by accessing the warranty data, the parts and associated maintenance data and/or the reference alert data from the respective databases 202, 204, 206 and collating, linking and/or otherwise associating the warranty data, the parts and associated maintenance data and/or the reference alert data to enable the data to be in a structured and/or queryable format (block 602). The central data processing center 113 accesses the machine input 108, 110, 112 at the interface 240 from the work vehicle 102, 104, 106 (block 604). The central data processing center 113 processes the alert data (block 606).

To generate a machine health score for the different work vehicles 102, 104, 106, in the illustrated example, the machine health score determiner 226 accesses the processed data and generates a machine health score for each of the work vehicles 102, 104, 106 and/or the machine health score classifier 227 determines an associated classification for the machine health scores determined (block 608). In some examples, accessing the processed data includes accessing data from one or more of the tallier 234, the diagnosis identifier 212, the resources allocation determiner 214, the probable parts determiner 216, the probable parts orderer 218, the probable parts arrival estimator 220, the alert and measurement scorer 222, the weighting factor applier 224 and, more generally, one or more of the inputs 108, 110, 112, 115, 116, 118, 126, 130, and generating a machine health score for each of the work vehicles 102, 104, 106 based on processing the accessed data. The comparator 210 compares the determined machine health scores and/or the associated classifications to reference data and/or otherwise to determine which of the work vehicles 102, 104, 106 are to be repaired and, if the work vehicles 102, 104, 106 are to be repaired, the order in which of the work vehicles 102, 104, 106 are to be repaired (block 610).

In examples in which the machine health score determiner 226, the machine health score classifier 227 and/or the comparator 210 determines that one or more repairs are to be performed on one or more of the work vehicles 102, 104, 106, the work order generator 230 generates the work order data 138 that causes a repair to be initiated on the one or more work vehicles 102, 104, 106 (block 612). In examples in which the machine health score determiner 226, the machine health score classifier 227 and/or the comparator 210 determines that one or more repairs are to be performed on the work vehicles 102, 104, 106, the worklist generator 228 generates the worklist data 142 that prioritizes the repair of one of the work vehicles 102, 104, 106 over the other of the work vehicles 102, 104 (block 614). At block 616, the central data processing center 113 provides the servicer 128 access to the work order data 138 and/or the worklist data 142 for display at, for example, the work station 140 (block 616).

FIG. 9 illustrates an example of implementing block 602 of FIG. 8. The program of FIG. 9 begins at block 702 with the model generator 208 accessing the warranty data, the parts and associated maintenance data and/or the reference alert and measurement data from the respective databases 202, 204, 206 (block 702). The model generator 208 collates, links and/or otherwise associates the warranty data, the parts and associated maintenance data and/or the reference alert data to enable the data to be in a structured and/or queryable format (e.g., a model, a framework, a structured model, a structured framework, etc.) (block 704). The model generator 208 associates the reference alerts with corresponding classifications such as a first classification and/or urgency of repair, a second classification and/or urgency of repair and/or a third classification and/or urgency of repair (block 706).

To enable the classifications of the alerts to represent the prioritizations of the owner/operator 120, 122, 124, the servicer 128 and/or the manufacturer 132, in the illustrated example, the model generator 208 accesses the weighting factor database 242 and/or the owner/operator input 115, 116, 118, the work order data 138 and/or the worklist data 142 to determine if any weighting factors are present for one or more of the alerts within the model (block 708). In examples in which weighting factors are present for one or more of the alerts, the model generator 208 updates the model based on the weighting factors and, more generally, associates the one or more alerts with the corresponding weighting factor(s) (block 710).

To enable the model and/or the alerts to incorporate feedback from the owner/operator 120, 122, 124, the servicer 128 and/or the manufacturer 132, in the illustrated example, the model generator 208 and/or the updater 232 accesses the owner/operator input 115, 116, 118, the work order data 138 and/or the worklist data 142 to determine if any feedback is present for one or more of the alerts within the model and/or for one or more of the work vehicles 102, 104, 106, etc. (block 712). In examples in which feedback is present, the model generator 208 and/or the updater updates the model based on the feedback and/or other input received (block 714). The process then returns to FIG. 8.

FIG. 10 illustrates an example of implementing block 606 of FIG. 8. The program of FIG. 10 begins at block 802 with the central data processing center 113 accessing and/or selecting one of the alerts of the machine input 108, 110, 112 at the interface 240 from the work vehicle 102, 104, 106 (block 802) and the time stamp identifier 238 determining when the selected alert was generated (block 804). The filter 236 processes the alerts within the machine input 108, 110, 112 and determines whether the alerts were generated within a threshold amount of time based on the time stamp identified (block 806). Based on the processing, the filter 236 filters the alerts from the machine inputs 108, 110, 112 that were identified as not being generated within the threshold amount of time (block 808). At block 810, the central data processing center 113 determines if there are additional alerts available from one or more of the work vehicles 102, 104, 106 (block 810). In examples in which additional alerts are available, the central data processing center 113 accesses a subsequent alert from the alert data of the machine input 108, 110, 112 at the interface 240 (block 812).

However, in examples in which additional alerts are not available, the tallier 234 determines the number of occurrences of each alert type from the work vehicles 102, 104, 106 (block 814) and the comparator 210 compares the alerts accessed from the work vehicles 102, 104, 106 to reference data and/or alerts within the model (block 816). At block 818, the comparator 210 determines if there is a substantial match between one or more of the alerts and the reference alert data in the model (block 818). If there is a substantial match between one or more of the alerts and the reference data, the diagnosis identifier 212 determines a diagnosis associated with the repair (block 820). Further, if there is a substantial match between one or more of the alerts and the reference data, the resources allocation determiner 214 determines the resources to be allocated to repair the associated work vehicle 102, 104, 106 and/or estimates the amount of time to repair the associated work vehicles 102, 104, 106 (block 822). Further, if there is a substantial match between one or more of the alerts and the reference data, the probable parts determiner 216 determines the probable parts used to perform the repair on the work vehicle 102, 104, 106 (block 824). At block 826, the central data processing center 113 associates the probable diagnosis, the estimated resources and/or time and/or the probable parts list with the corresponding alert (block 826).

In examples in which the probable part determiner 216 determines that parts are to be used to repair the work vehicle 102, 104, 106, the probable parts orderer 218 determines whether the part and/or parts to be used during the repair are in stock and/or are otherwise available (block 828). In examples in which the probable parts orderer 218 determines that the part and/or parts are not in stock, the probable parts orderer 218 places an order for the one or more parts (block 830) and the probable parts arrival estimator 220 estimates when the parts will arrival (block 832). At block 834, the central data processing center 113 associates the estimated arrival time of the probable parts with the corresponding alert (block 834).

To determine the severity of and/or to otherwise classify the alerts, the alert and measurement scorer 222 determines if there is a classification for one or more of the alerts within the model (block 836). In examples in which there is a substantial match between the one or more alerts from the machine input 108, 110, 112 and a reference alert having a corresponding classification, the alert and measurement scorer 222 associates the classification with the corresponding alert from the machine input 108, 110, 112 (block 838).

The weighting factor applier 224 determines if there is a weighting factor for one or more of the alerts from the machine input 108, 110, 112 using, for example, data from the model and/or data from the weighting factor database 242 (block 840). In examples in which there is a weighting factor associated with the alert from the machine input 108, 110, 112, the weighting factor applier 224 applies the weighting factor to the associated alert and/or otherwise associates the alert with the corresponding weighting factor (block 842). The process then returns to FIG. 8.

Figure 11:
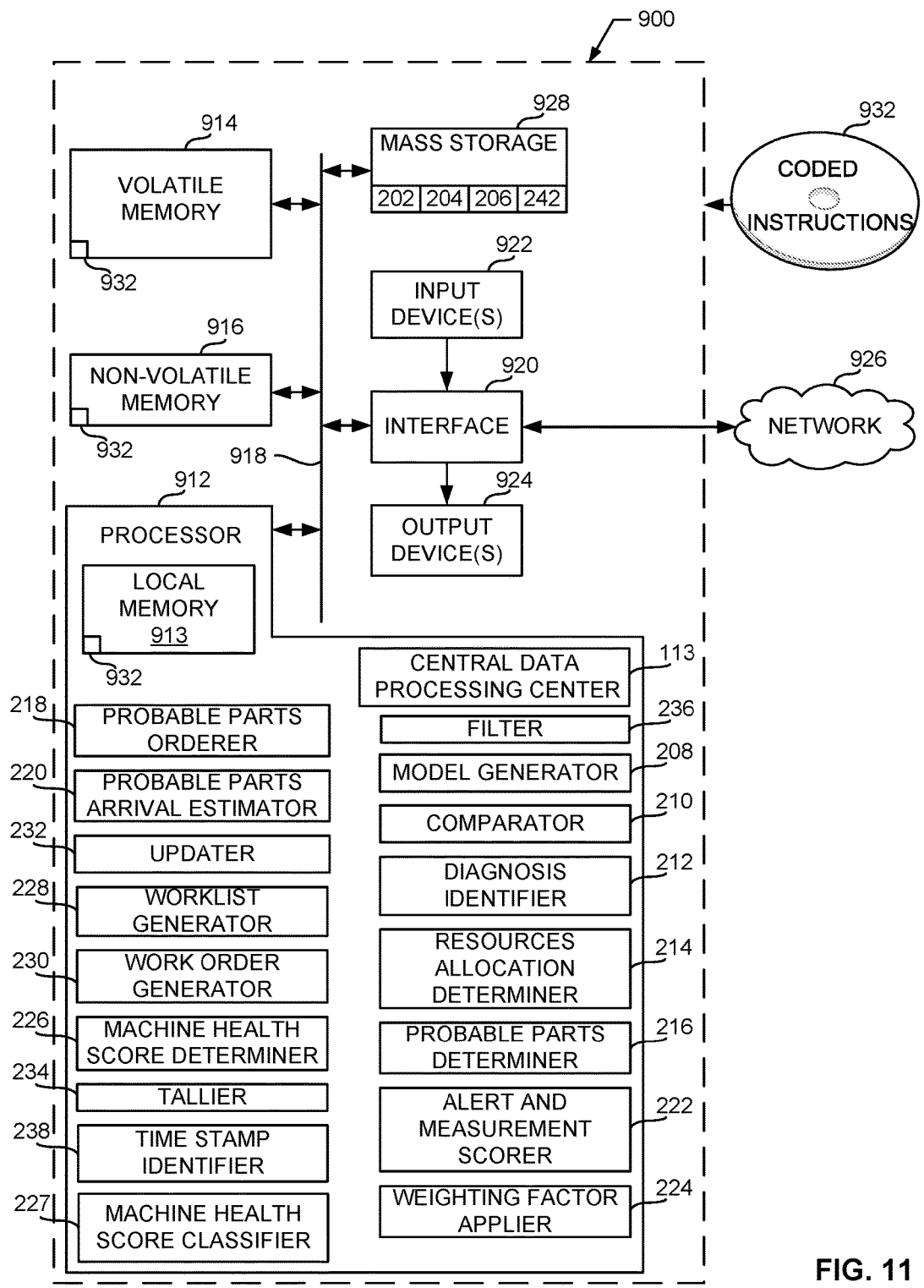
FIG. 11 is a processor platform to execute the instructions of FIGS. 8, 9 and 10 to implement the central data processing center of FIGS. 1 and/or 2.

FIG. 11 is a block diagram of an example processor platform 900 capable of executing the instructions of FIGS. 8, 9 and 10 to implement the central data processing center 113 of FIG. 2. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor 912 implements the example model generator 208, the example comparator 210, the example diagnosis identifier 212, the example resources allocation determiner 214, the example probable parts determiner 216, the probable parts orderer 218, the example probable parts arrival estimator 220, the example alert and measurement scorer 222, the example weighting factor applier 224, the example machine health score determiner 226, the example machine health score classifier 227, the example worklist generator 228, the example work order generator 230, the example updater 232, the example tallier 234, the example filter 236, the example time stamp identifier 238, the example weighting factor database 242, and the example central data processing center 113.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input devices 922 can be used to implement the interface 240. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be used to implement the interface 240. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 8, 9 and 10 may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that enable work vehicle repairs to be identified and/or prioritized to enable an efficient and/or cost-effective approach to be taken when making such repairs. In some examples, repairs of some work vehicles are prioritized over the repair of other vehicles based on one or more agreements being in place, feedback from a manufacturer, feedback from an owner/operator and/or feedback from a servicer (e.g., a dealer). The feedback may be updatable (e.g., automatically updatable and/or manually updatable) to enable repair prioritizations to change based on one or more factors. In some examples, the repair prioritizations are based on usage statistics of the different work vehicles, the usage demand of the different work vehicles based on the time of year, usage demand based on work being completed by the owner/operator, etc.

In some examples, to assist with the repair prioritizations, machine health scores may be determined based on one or more alerts generated by a work machine, the frequency of those alerts being generated and/or one or more weighting factors associated with the work machine and/or the alert. In some examples, the weighting factors are between 0 and 1, but the weighting factors can be any other number based on the situation and/or the repair. In some examples, the machine health score being greater than a threshold indicates that the work vehicle requires more urgent repair whereas the machine health score satisfying or being less than the threshold indicates that the work vehicle does not require urgent repair (e.g., no maintenance, routine maintenance, etc.). In some examples, the machine health score may be used to rank work vehicles relative to one another. Further, the examples disclosed herein relate to processing diagnostic trouble codes (DTC) to identify a fault on the work vehicle and/or maintenance or a repair to take place on the work vehicle, a component of the work vehicle and/or a vehicle system. In some examples, using the examples disclosed herein, a servicer can create job requests, create repair orders, change the status level and/or classification of a job and/or alert and/or ignore and/or report a nuisance alert.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
an interface to access a first alert from a first work vehicle and a second alert from a second work vehicle;

an alert scorer to generate a first score for the first alert and a second score for the second alert, the first and second scores associated with a severity of the respective alerts;
a weighting factor applier to associate a first weighting factor with the first alert and to associate a second weighting factor with the second alert;
a machine health score determiner to determine a first machine health score for the first work vehicle based on the first score and the first weighting factor and a second machine health score for the second work vehicle based on the second score and the second weighting factor; and
a worklist generator to generate a worklist indicating that the second work vehicle is to be repaired prior to the first work vehicle based on at least one of the first machine health score or an associated first classification and at least one of the second machine health score or an associated second classification.

2. The apparatus of claim 1, wherein the first weighting factor is associated with one or more of a time of year, a usage demand of the first work vehicle, or a service agreement associated with the first work vehicle.

3. The apparatus of claim 1, wherein one or more of the first score or the first weighting factor is determined based on an occurrence count for the first alert and a visibility score for the first alert, the visibility score associated with a visibility of the first alert to an operator of the first work vehicle.

4. The apparatus of claim 1, further including a machine health score classifier to determine the first classification based on the first machine health score being above an average of machine health scores for a time period, the machine health score classifier to determine the second classification based on the second machine health score being associated with the average of the machine health scores for the time period.

5. The apparatus of claim 1, wherein the machine health score determiner is to determine the first machine health score by summing products of other scores and other weighting factors associated with the first work vehicle.

6. The apparatus of claim 1, wherein the worklist is a first worklist, the machine health score determiner is to update the first machine health score in substantially real time based on third alerts accessed from the first work vehicle and the worklist generator is to generate a second worklist indicating that the first work vehicle is to be repaired prior to the second work vehicle based on at least one of the updated first machine health score or the associated classification.

7. The apparatus of claim 1, further including:
a diagnosis identifier to identify a repair to be performed on the first work vehicle based on the first alert;
a work order generator to generate a work order to perform the repair on the first work vehicle;
a probable parts determiner to determine one or more probable parts to be used to repair the first work vehicle; and
a probable parts orderer to generate an order for the one or more probable parts when the one or more parts are determined as not being available, wherein the worklist generator is to indicate the second work vehicle is to be repaired prior to the first work vehicle based on an estimated arrival time of the one or more parts.

8. The apparatus of claim 1, further including a resources allocation determiner to determine a first resources allocation to repair the first work vehicle based on the first alert and a second resources allocation to repair the second work vehicle based on the second alert, wherein the worklist generator is to indicate the second work vehicle is to be repaired prior to the first work vehicle based on the first resources allocation and the second resources allocation.

9. The apparatus of claim 1, wherein the first weighting factor or the second weighting factor is based on one or more of operator input, owner input, service input, or manufacturer input.

10. A tangible computer-readable medium comprising instructions that, when executed, cause a processor to, at least:
access a first alert from a first work vehicle and a second alert from a second work vehicle;
generate a first score for the first alert and a second score for the second alert, the first and second scores associated with a severity of the respective alerts;
associate a first weighting factor with the first alert and to associate a second weighting factor with the second alert;
determine a first machine health score for the first work vehicle based on the first score and the first weighting factor and a second machine health score for the second work vehicle based on the second score and the second weighting factor; and
generate a worklist indicating that the second work vehicle is to be repaired prior to the first work vehicle based on at least one of the first machine health score or an associated first classification and at least one of the second machine health score or an associated second classification.

11. The computer-readable medium as defined in claim 10, wherein the first weighting factor is associated with one or more of a time of year, a usage demand of the first work vehicle, or a service agreement associated with the first work vehicle.

12. The computer-readable medium as defined in claim 10, wherein the instructions, when executed, further cause the processor to determine the first classification based on the first machine health score being above an average of machine health scores for a time period, the processor to determine the second classification based on the second machine health score being associated with the average of the machine health scores for the time period.

13. The computer-readable medium as defined in claim 10, wherein the first machine health score is determined by summing products of other scores and other weighting factors associated with the first work vehicle.

14. The computer-readable medium as defined in claim 10, wherein the worklist is a first worklist, wherein the instructions, when executed, further cause the processor to update the first machine health score in substantially real time based on third alerts accessed from the first work vehicle and to generate a second worklist indicating that the first work vehicle is to be repaired prior to the second work vehicle based on at least one of the updated first machine health score or the associated classification.

15. The computer-readable medium as defined in claim 10, wherein the instructions, when executed, further cause the processor to:
identify a repair to be performed on the first work vehicle based on the first alert;
generate a work order to perform the repair on the first work vehicle;
determine one or more probable parts to be used to repair the first work vehicle; and
generate an order for the one or more probable parts when the one or more parts are determined as not being available, wherein the second work vehicle is to be repaired prior to the first work vehicle based on an estimated arrival time of the one or more parts.

16. The computer-readable medium as defined in claim 10, wherein the instructions, when executed, further cause the processor to determine a first resources allocation to repair the first work vehicle based on the first alert and a second resources allocation to repair the second work vehicle based on the second alert, wherein the second work vehicle is to be repaired prior to the first work vehicle based on the first resources allocation and the second resources allocation.

17. A method, comprising:
   accessing, by executing an instruction with at least one processor, a first alert from a first work vehicle and a second alert from a second work vehicle;
   generating, by executing an instruction with the at least one processor, a first score for the first alert and a second score for the second alert, the first and second scores associated with a severity of the respective alerts;
   associating, by executing an instruction with the at least one processor, a first weighting factor with the first alert and to associate a second weighting factor with the second alert;
   determining, by executing an instruction with the at least one processor, a first machine health score for the first work vehicle based on the first score and the first weighting factor and a second machine health score for the second work vehicle based on the second score and the second weighting factor; and
   generating, by executing an instruction with the at least one processor, a worklist indicating that the second work vehicle is to be repaired prior to the first work vehicle based on at least one of the first machine health score or an associated first classification and at least one of the second machine health score or an associated second classification.

18. The method of claim 17, further including determining the first classification based on the first machine health score being above an average of machine health scores for a time period, and determining the second classification based on the second machine health score being associated with the average of the machine health scores for the time period.

19. The method of claim 17, wherein the first machine health score is determined by summing products of other scores and other weighting factors associated with the first work vehicle.

20. The method of claim 17, wherein the worklist is a first worklist, further including updating the first machine health score in substantially real time based on third alerts accessed from the first work vehicle and to generate a second worklist indicating that the first work vehicle is to be repaired prior to the second work vehicle based on at least one of the updated first machine health score or the associated classification.

* * * * *